US012716867B2

(12) United States Patent
Vilkov et al.

(10) Patent No.: US 12,716,867 B2
(45) Date of Patent: Aug. 25, 2026

(54) METHODS AND SYSTEMS FOR ION MOBILITY SPECTROMETRY

(71) Applicant: Analytical Detection LLC, Lake Forest, CA (US)

(72) Inventors: Andrey N. Vilkov, Aliso Viejo, CA (US); Joseph Adam Widjaja, Laguna Hills, CA (US); Jack Albert Syage, Corona del Mar, CA (US); Brent D. Goldberg, Riverside, CA (US)

(73) Assignee: ANALYTICAL DETECTION LLC, Mission Viejo, CA (US)

( * ) Notice: Subject to any disclaimer, the term of this patent is extended or adjusted under 35 U.S.C. 154(b) by 294 days.

(21) Appl. No.: 18/463,570

(22) Filed: Sep. 8, 2023

(65) Prior Publication Data

US 2025/0085256 A1 Mar. 13, 2025

(51) Int. Cl.
*G01N 27/622* (2021.01)

(52) U.S. Cl.
CPC .................................. *G01N 27/622* (2013.01)

(58) Field of Classification Search
CPC .................................................... G01N 27/622
See application file for complete search history.

(56) References Cited

U.S. PATENT DOCUMENTS 5,796,099 A * 8/1998 Jackson ............... G01N 27/622 250/282
5,968,837 A 10/1999 Döring et al.
7,709,788 B2 5/2010 Geraghty et al.
7,820,965 B2 10/2010 Nagano et al.
8,716,656 B2 5/2014 Peng et al.
9,945,813 B2 * 4/2018 McIntyre ............ H01J 49/0009
10,600,627 B2 * 3/2020 Giles ....................... H01J 49/40

(Continued)

FOREIGN PATENT DOCUMENTS

CN 112098502 A * 12/2020 ........... G01N 27/622
CN 218824067 U 4/2023

(Continued)

OTHER PUBLICATIONS

Extended Search Report from counterpart European Application No. 24197762.8 dated Jan. 30, 2025, 34 pp.
Wallis et al., "Instrument Response Measurements of Ion Mobility Spectrometers in situ: Maintaining optimal system performance of fielded systems", The International Society for Optical Engineering, SPIE, May 12, 2005, 54-64 pp.
Waraksa et al., "Dopants and gas modifiers in ion mobility spectrometry", Trends in Analytical Chemistry 82, vol. 82, Elsevier B.V., Sep. 1, 2016, pp. 237-249.

(Continued)

*Primary Examiner* — Wyatt A Stoffa
*Assistant Examiner* — Larry Li
(74) *Attorney, Agent, or Firm* — Shumaker & Sieffert, P.A.

(57) ABSTRACT

An example ion mobility spectrometry system includes a drift chamber, an ion detector, a thermal sensor, and processing circuitry. The drift chamber is configured to receive an ionized sample and an ionized calibrant. The ion detector is configured to generate a drift signal in response to detecting drifted ions at a predetermined position along the drift chamber. The thermal sensor is configured to generate a temperature signal indicative of a temperature of the drift chamber. The processing circuitry is configured to determine, based on the temperature signal, a mobility relation for a target species; determine, based on the drift signal, calibrant and sample drift times; determine, based on the mobility relation and the calibrant drift time, a target drift time; and detect the target species in the ionized sample by comparing the sample drift time with the target drift time.

20 Claims, 8 Drawing Sheets

(56) References Cited

U.S. PATENT DOCUMENTS

| | | | | |
|---|---|---|---|---|
| 12,117,412 | B2 * | 10/2024 | Renner | G01N 27/622 |
| 2007/0228269 | A1 * | 10/2007 | Miller | G01N 27/622 250/288 |
| 2008/0230689 | A1 | 9/2008 | Stott et al. | |
| 2009/0166524 | A1 * | 7/2009 | Geraghty | G01N 27/622 250/282 |
| 2011/0068264 | A1 * | 3/2011 | Xu | G01N 27/622 250/288 |
| 2012/0004862 | A1 * | 1/2012 | Hill, Jr. | G01N 27/622 250/282 |
| 2015/0129760 | A1 * | 5/2015 | Beil | H01J 49/0009 250/281 |
| 2017/0213715 | A1 | 7/2017 | Davila et al. | |
| 2018/0372683 | A1 * | 12/2018 | Hauck | H01J 49/24 |
| 2019/0391114 | A1 * | 12/2019 | Arnold | G01N 27/622 |
| 2023/0089568 | A1 * | 3/2023 | Marriott | H01J 49/004 250/287 |
| 2024/0044841 | A1 * | 2/2024 | Ujma | H01J 49/40 |

FOREIGN PATENT DOCUMENTS

| | | | |
|---|---|---|---|
| EP | 3143389 | A1 | 3/2017 |
| WO | 2006123107 | A1 | 11/2006 |
| WO | 2015173579 | A1 | 11/2015 |

OTHER PUBLICATIONS

Response to Extended Search Report dated Jan. 30, 2025, from counterpart European Application No. 24197762.8 filed Aug. 21, 2025, 70 pp.

Communication pursuant to Article 94(3) EPC from counterpart European Application No. 24197762.8 dated Jun. 24, 2026, 6 pp.

* cited by examiner

METHODS AND SYSTEMS FOR ION MOBILITY SPECTROMETRY

TECHNICAL FIELD

The present disclosure generally relates to methods and systems for detecting chemical substances, and in particular, to ion mobility spectrometry.

BACKGROUND

Trace detection systems are designed to collect, analyze, and identify minute amounts, such as picograms or nanograms, of substances of interest that may otherwise be completely invisible to the unaided eye. Substances of interest to be detected by trace detection systems include explosives, drugs, chemical weapons, and toxic industrial chemicals. A sample including trace amounts of an analyte may be collected, and vaporized. The vaporized sample may be ionized and subsequently analyzed. Ion Mobility Spectrometry (IMS) and Mass Spectrometry (MS) trace detectors are commonly used methods to detect explosive, narcotics, and chemical weapon threats with high sensitivity and rapid analysis capabilities.

SUMMARY

The present disclosure describes system, techniques, and devices for ion mobility spectrometry. An ionized calibrant and an ionized sample may be introduced into a drift chamber, and respective calibrant and sample drift times may be determined based on a drift signal received from an ion detector. A thermal sensor may be used to determine a temperature of the drift chamber. Based on the mobility dependence of one or more analyte ions and a calibrant ion (for example, when the adduct ions are formed), it may be possible to determine the temperature dependence of both ions and derive a relationship that allows a determination of drift or mobility times in the drift chamber, irrespective of changes in temperature of the drift chamber or ion mobility spectrometry apparatus. Thus, electromechanical control of the temperature of the drift chamber may not be required. Furthermore, without being bound by theory, operation at ambient temperature versus controlled higher temperatures may preserve the stability of thermally labile compounds, enhancing their detection performance. A target drift time for a target species being detected in a sample, for example, may be determined based on a temperature-dependent mobility relation and the calibrant drift time. The sample drift time may be compared with the target drift time, and a match of the sample drift time with the target drift time may indicate a presence of the target species in the analyte. Conversely, a divergence of the sample drift time from the target drift time, for example, beyond a predetermined tolerance range, may indicate an absence of the target species in the analyte. In conventional ion mobility spectrometry, the drift chamber is typically heated to elevated temperatures, for example, to 100° C. Without being bound by theory, using a temperature-dependent mobility relation may account for the effect of temperature on drift times, and allow performing ion mobility spectroscopy without heating the drift chamber to elevated temperatures. Thus, systems, techniques, and devices according to the present disclosure may be used to perform ion mobility spectroscopy at relatively low temperatures, for example, at room temperature.

In some examples, a method of ion mobility spectroscopy includes using at least one of dipropylene glycol monomethyl ether (DPGME) or salicylic acid as a calibrant. Without being bound by theory, in a positive mode, DPGME has a drift time in the ion mobility spectrometer that is different from the drift times typical of target chemicals, for example, triacetone triperoxide (TATP). Thus, the drift time of the calibrant (DPGME) may be sufficiently distinct from the drift time of one or more target chemicals, which may promote the accuracy of ion mobility spectrometry. Moreover, DPGME may be only marginally suppressed by common chemicals typically presented in ambient environment, and thus have little to no impact by interference from such common chemicals in ion mobility spectrometry.

In a negative ionization mode, salicylic acid may form an ion peak having a calibrant drift time different from typical target chemicals including conventional military, commercial and homemade explosives. The salicylic acid peak has the drift time higher than any other volatile calibrants commonly used in ion mobility spectrometry, which may promote the accuracy of calibration in ion mobility spectrometry. The salicylic acid peak is typically not suppressed by common air borne interferents. Both DPGME and salicylic acid have relatively low toxicity, and are biodegradable.

In some examples, a method of ion mobility spectroscopy includes using dipropylene glycol monomethyl ether (DPGME) as a dopant. If a target chemical being detected is a peroxide-based substance (for example, a peroxide-based explosive substance, such as TATP), DGPME may form an adduct with TATP in a gas-phase reaction, which may further fragment to one or more fragment ions. Detecting the peaks associated with the adduct or the fragment ions may further promote specificity toward detection and identification of peroxide-based substances, for example, of TATP.

In some examples, an example ion mobility spectrometry system includes a drift chamber configured to receive an ionized sample and an ionized calibrant. The system further includes an ion detector configured to generate a drift signal in response to detecting drifted ions at a predetermined position along the drift chamber. The system further includes a thermal sensor configured to generate a temperature signal indicative of a temperature of the drift chamber. The system further includes processing circuitry configured to determine, based on the temperature signal, a mobility relation for a target species with respect to the ionized calibrant. The processing circuitry is further configured to determine, based on the drift signal, a calibrant drift time and a sample drift time. The processing circuitry is further configured to determine, based on the mobility relation and the calibrant drift time, a target drift time for the target species. The processing circuitry is further configured to detect the target species in the ionized sample by comparing the sample drift time with the target drift time.

In some examples, a portable spectrometry device includes a handheld housing, the handheld housing including the ion mobility spectrometry system.

In some examples, an example method for ion mobility spectrometry includes introducing an ionized sample and an ionized calibrant in a drift chamber. The method may further include generating, by an ion detector, a drift signal in response to detecting drifted ions at a predetermined position along the drift chamber. The method may further include generating, by a thermal sensor, a temperature signal indicative of a temperature of the drift chamber. The method may further include, by processing circuitry, determining, based on the temperature signal, a mobility relation for a target species with respect to the ionized calibrant. The method may further include, by processing circuitry, determining, based on the drift signal, a calibrant drift time and a sample drift time. The method may further include, by processing circuitry, determining, based on the mobility relation and the calibrant drift time, a target drift time for the target species. The method may further include, by processing circuitry, detecting the target species in the ionized sample by comparing the sample drift time with the target drift time.

In some examples, example non-transitory computer-readable media may include instructions that, when executed, cause processing circuitry to determine, based on a drift signal received from an ion detector in response to detecting drifted ions at a predetermined position along a drift chamber, a calibrant drift time of an ionized calibrant and a sample drift time of an ionized sample in the drift chamber. The instructions may further, when executed, cause the processing circuitry to determine, based on a temperature signal indicative of a temperature of the drift chamber received from a thermal sensor, a mobility relation for a target species with respect to the ionized calibrant. The instructions may further, when executed, cause the processing circuitry to determine, based on the mobility relation and the calibrant drift time, a target drift time for the target species. The instructions may further, when executed, cause the processing circuitry to detect the target species in the ionized sample by comparing the sample drift time with the target drift time.

In some examples, a method for detecting a chemical substance includes introducing a sample including at least one chemical substance into an ionization region of an ion mobility spectrometer. The method may further include introducing a reagent gas into the region, where the reagent gas includes dipropylene glycol monomethyl ether. The method may further include generating ion(s) at least one of the at least one chemical substance or the reagent gas within the region. The method may further include allowing the ion(s) to interact with at least one of the chemical substance or the reagent gas within the region, where the interaction yields one or more analyte ions. The method may further include performing an analysis of the analyte ions.

In some examples, a method for calibration of an ion mobility spectrometer includes introducing a sample including at least one chemical substance into an ionization region of an ion mobility spectrometer. The method may further include introducing a calibrant chemical into the region, where the calibrant chemical includes at least one of dipropylene glycol monomethyl ether or salicylic acid. The method may further include generating ions of the at least one chemical substance and the calibrant chemical within the region. The method may further include determining the drift time of ions of the calibrant chemical through the ion mobility spectrometer. The method may further include determining the expected drift time of a target chemical using pre-determined relations (for example, ratios) of the reduced mobilities of the target chemical and the calibrant chemical.

In some examples, a method for calibration of an ion mobility spectrometer includes delivering a sample including at least one chemical substance into an ionization region of an ion mobility spectrometer. The method may further include introducing a calibrant gas into the region. The method may further include generating ions of the at least one chemical substance and the calibrant chemical within the region. The method may further include determining the drift time of ions of the calibrant chemical through the ion mobility spectrometer. The method may further include determining the expected drift time of a target chemical using relations (for example, ratios) of the reduced mobilities of the target chemical and the calibrant chemical. At least one relation is a function of temperature measured by a temperature sensor located in the vicinity of the ion mobility spectrometer.

In some examples, a system for detecting a chemical substance includes an ion mobility spectrometer including a gas ionization region, where sample vapor and reagent gas molecules may be ionized. The system further includes a drift region fluidly coupled with the ionization region, where an electric field is provided to transport ions towards a charge collector and the charge collector at the end of the drift region opposite the ionization region. The system may further include a compartment fluidly coupled with the ionization region, where a reagent gas is produced from solid or liquid-phase reagent chemicals including dipropylene glycol monomethyl ether (DPMGE). The system may further include an analysis unit configured to detect the presence of the one or more analyte ions of chemical substance in the sample from a drift time of the analyte ion through the drift region.

In some examples, a system for calibration of an ion mobility spectrometer includes an ion mobility spectrometer including a gas ionization region, where sample vapor and calibrant gas molecules may be ionized. The system further includes a drift region fluidly coupled with the ionization region, where an electric field is provided to transport ions towards a charge collector and the charge collector at the end of the drift region opposite the ionization region. The system may further include a compartment fluidly coupled with the ionization region, where a calibrant gas is produced from solid or liquid-phase reagent chemicals including at least one of dipropylene glycol monomethyl ether (DPMGE) or salicylic acid. The system may further include an analysis unit configured to determine the expected drift time of a target chemical using pre-determined relations (for example, ratios) of the reduced mobilities of the target chemical and the calibrant chemical.

In some examples, a system for calibration of an ion mobility spectrometer includes an ion mobility spectrometer including a gas ionization region, where sample vapor and calibrant gas molecules are ionized. The system further includes a drift region fluidly coupled with the ionization region, where an electric field is provided to transport ions towards a charge collector and the charge collector at the end of the drift region opposite the ionization region. The system may further include a compartment fluidly coupled with the ionization region, where the calibrant gas is produced. The system may further include a temperature sensor in the vicinity of the ion mobility spectrometer. The system may further include an analysis unit that determines the expected drift time of a target chemical using relations (for example, ratios) of the reduced mobilities of the target chemical and the calibrant chemical, where at least one relation (for example, a ratio) is a function of temperature measured by the temperature sensor.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
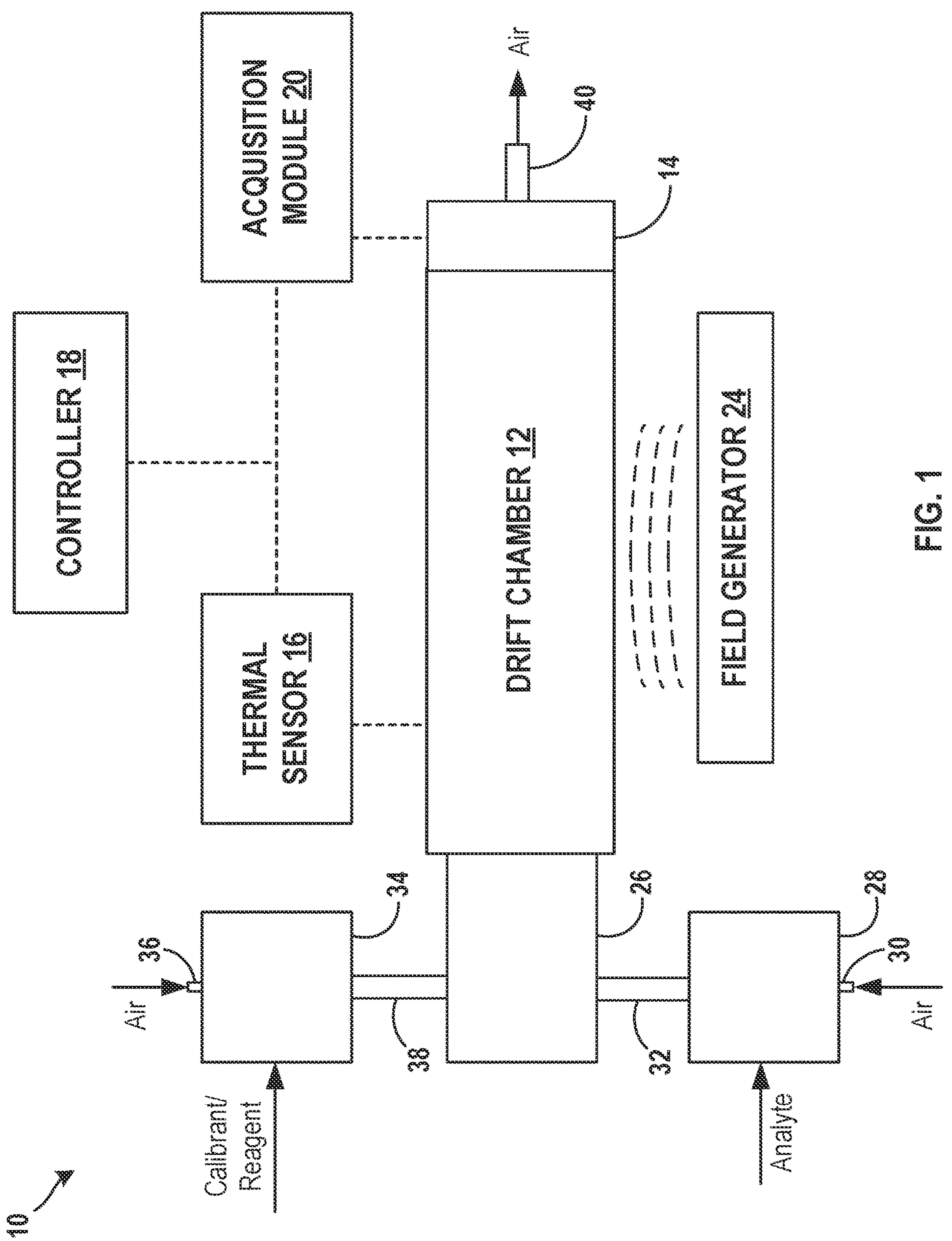
FIG. 1 is a block diagram illustrating an example system for ion mobility spectrometry, in accordance with one or more aspects of this disclosure.

The present disclosure describes system, techniques, and devices for ion mobility spectrometry. The specificity of an ion mobility spectrometry (IMS) technique or system refers to its ability to selectively detect and differentiate between different ions or analytes in a mixture. IMS is an analytical technique that is commonly used for the detection and identification of trace amounts of chemicals, including drugs, explosives, and volatile organic compounds. The specificity of an IMS technique or system arises from the combination of several factors, including chemical selectivity and measurement accuracy.

Conventional IMS techniques typically require heated drift chambers or drift tubes, for example, tubes heated to predetermined elevated temperatures, such as 100° C. In some examples according to the present disclosure, a temperature-dependent mobility relation is used to relate a target drift time of a target species to a calibrant drift time of a calibrant for a sensed temperature of a drift chamber. The target drift time can then be compared with a sample drift time of a sample to detect the target species in the sample. For example, a sample drift time that is substantially the same as, or within a predetermined tolerance range of, the target drift time is indicative of presence of the target species.

In some examples, an example ion mobility spectrometry system includes a drift chamber configured to receive an ionized sample and an ionized calibrant. The system further includes an ion detector configured to generate a drift signal in response to detecting drifted ions at a predetermined position along the drift chamber. The system further includes a thermal sensor configured to generate a temperature signal indicative of a temperature of the drift chamber. The system further includes processing circuitry configured to determine, based on the temperature signal, a mobility relation for a target species with respect to the ionized calibrant. The processing circuitry is further configured to determine, based on the drift signal, a calibrant drift time and a sample drift time. The processing circuitry is further configured to determine, based on the mobility relation and the calibrant drift time, a target drift time for the target species. The processing circuitry is further configured to detect the target species in the ionized sample by comparing the sample drift time with the target drift time.

Thus, the thermal sensor may be used to determine the temperature of the drift tube being at room temperature, or some ambient temperature, or any other temperature. Based on the temperature, the temperature-dependent mobility relation may be determined for a combination of (i) a predetermined calibrant and (ii) a target species that may be present in a sample introduced in the drift chamber. Therefore, a target species may be detected at relatively lower temperatures compared to conventional IMS, for example, because the mobility relation accounts for the sensed temperature of the drift tube. Likewise, target species may be detected in heated drift tubes, but where the temperature of the drift tube may yet be maintained at temperatures lower than the elevated temperatures used in conventional IMS. However, in some examples, target species may be detected in drift tubes heated to conventional temperatures, using an appropriate selection of mobility relation.

In IMS, reagents such as dopants may be used to enhance the specificity of the technique. Dopants are added to the carrier gas in IMS to promote the ionization and detection of analyte molecules. Different dopants exhibit varying degrees of chemical selectivity towards specific analyte classes. For example, some dopants may preferentially ionize nitrogen-containing compounds, while others may be more effective in ionizing explosives or drugs. The choice of dopant can, therefore, be tailored to target specific types of analytes, enhancing the specificity of the IMS system for particular applications.

In IMS, an ion mobility calibrant (also referred to herein as "calibrant") is a compound with well-known and precisely measured ion mobility value. It is used as a reference standard to calibrate the IMS instrument and establish a relation between the measured ion mobility and the mobility of specific ions of interest. Using an ion mobility calibrant helps ensure the accuracy and precision of the ion mobility measurements by providing a reliable reference point for the conversion of measured instrument responses to ion mobility values.

For example, the drift time of the calibrant peak may be measured in each plasmagram. The drift time of the calibrant peak may be also measured in the beginning of each sample introduction event. The drift time of the calibrant peak may be also measured in certain time intervals. The expected drift time of a target chemical may be then determined using pre-determined relations (for example, ratios) of the reduced mobilities of said target chemical and said calibrant chemical.

In addition to, or instead of, using the temperature-dependent mobility relation, particular dopants or calibrants may be used to promote accuracy of IMS. In some examples, dipropylene glycol monomethyl ether (DPGME) may be used as a dopant or reagent, that interacts or reacts with a target species to generate a product species that may be more accurately detected by IMS compared to the target species itself. The CAS number of DPGME is 34590-94-8, and the chemical formula is $C_7H_{16}O_3$. The toxicity of DPGME is relatively low. DPGME quickly biodegrades under aerobic conditions resulting in very low bioaccumulation potential. Inhalation exposure of DPGME is greater than 75 ppm and self-limiting due to the irritant effects to the eyes and respiratory tract. For example, peroxide-based explosive substances including triacetone triperoxide (TATP) may react in gas-phase with DPGME. The resulted ionized adduct molecule of TATP and DPGME may further fragment to one or more fragment ions, which may be also detected by an ion mobility spectrometer further improving its specificity towards the detection and identification of TATP explosive substance.

In some examples, DPGME may be used as a calibrant in IMS. For example, in a positive mode, the DPGME calibrant has a drift time in the ion mobility spectrometer that is different from the drift times typical of target chemicals including TATP. DPGME may be only marginally suppressed by common chemicals typically presented in ambient environment.

In some examples, salicylic acid may be used as a calibrant in IMS. For example, in a negative mode salicylic acid forms an ion peak with the drift time different from typical target chemicals including regular military, commercial and homemade explosives. This peak has a drift time higher than any other volatile calibrants commonly used in ion mobility spectrometry, resulting in more accurate calibration compared to the other calibrants. The CAS number of salicylic acid is 69-72-7. The IUPAC name is 2-Hydroxybenzoic acid. The chemical formula of salicylic acid is $C_7H_6O_3$. Salicylic acid is low toxic and fully biodegradable.

Further, the salicylic acid peak is typically not suppressed by common air borne interferents, but forms adduct ions with a set of explosives including PETN, ethylene glycol dinitrate (EGDN), Royal demolition explosive (RDX or cyclonite), nitroglycerin (NG), and nitrates. Thus, salicylic acid may serve as a dopant for trace detection of explosive substances.

In some examples, the present disclosure describes techniques for calibrating an IMS system. Conventionally, an expected drift time of a target chemical is determined using a single pre-determined relation (for example, a ratio) of the reduced mobilities of target chemical and calibrant chemical. Less commonly, the entire plasmagram is divided into separate segments with respective pre-determined relations (for example, ratios) where respective relations may be distinct and be linked to distinct calibrant chemicals. Systems and techniques according to the present disclosure may utilize individual relations for predetermined combinations of target species and calibrant, wherein individual relations are functions of drift gas temperature. The drift gas temperature may be measured in the vicinity of a drift chamber or drift tube as well as an ambient temperature if the drift tube is not temperature controlled. The calibration may also be accomplished in two steps using first a pre-determined relation (for example, a ratio) common for all chemical substances and then second using a temperature-dependent adjustment function individual for each substance.

In some examples, an example system may include an ion mobility spectrometer including a gas ionization chamber or region, where chemical substance vapor and reagent gas molecules are ionized, a drift chamber or region fluidly coupled with the ionization region, with an electric field generated to induct transport of ions along the drift chamber towards a charge collector at the end of the drift region opposite the ionization region. The system may also include a compartment including a DPMGE dopant chemical fluidly coupled with a gas ionization region. The dopant compartment may be either temperature-controlled or kept at ambient temperature. In some examples, an IMS system may include a compartment including at least one of DPMGE or salicylic acid as calibrant, fluidly coupled with the gas ionization region. The calibrant compartment may be either temperature-controlled or kept at ambient temperature. The system may include a controller or an analysis unit that determines the expected drift time of a target chemical using pre-determined relations (for example, ratios) of the reduced mobilities of said target chemical and said calibrant chemical.

In some examples, a system for calibration of an ion mobility spectrometer includes an ion mobility spectrometer including a gas ionization region, where chemical substance vapor and reagent gas molecules are ionized, a drift region fluidly coupled with the ionization region, and an electric field generated to induce transport of ions towards a charge collector at the end of the drift region opposite the ionization region. The system may also include a compartment including at least one of DPMGE or salicylic acid as calibrant fluidly coupled with a gas ionization region. The calibrant compartment may be either temperature-controlled or kept at ambient temperature. The system may further include a thermal sensor. The thermal sensor may be located in the vicinity or within the ion mobility spectrometer. In case the drift region is thermally controlled, the sensor may be located in the proximity to the drift region. The system may include a controller or an analysis unit that determines the expected drift time of a target chemical using relations (for example, ratios) of the reduced mobilities of a target species relative to a calibrant, where at least one relation (for example, a ratio) is a function of temperature measured by said thermal sensor.

FIG. 1 is a block diagram illustrating an example system 10 for ion mobility spectrometry, in accordance with one or more aspects of this disclosure. System 10 may include a drift chamber 12, an ion detector 14, a thermal sensor 16, and a controller 18. Drift chamber 12 is configured to receive an ionized sample and an ionized calibrant. Drift chamber 12 may include a housing. The housing may include at least one metal or alloy, or any other suitable material. The housing may be cylindrical or tubular (so that the drift chamber is a drift tube), or have any other suitable shape.

The ion detector 14 is configured to generate a drift signal in response to detecting drifted ions at a predetermined position along drift chamber 12. The ion detector 14 may be positioned at or near the predetermined position. In some examples, ion detector 14 is positioned at or adjacent an end or a face of drift chamber 12. In some examples, ion detector 14 includes an ion collector configured to attract the ionized sample and the ionized calibrant. For example, the ion collector may include a Faraday cup.

Thermal sensor 16 is configured to sense a temperature of drift chamber 12 (for example, within an interior drift region of drift chamber 12) and generate a temperature signal indicative of the temperature of drift chamber 12. Thermal sensor 16 may include a thermocouple, a resistance temperature detector (RTD) sensor, an infrared (IR) sensor, or any other suitable sensor. Thermal sensor 16 (or a probe thereof) may be positioned to sense a temperature within an interior of drift chamber 12, at a surface of drift chamber 12, an area near drift chamber 12, or another location whose temperature may be correlated to a temperature within a drift region within drift chamber 12. In some examples, system 10 includes a plurality of thermal sensors 16, and a temperature of a drift region or an interior of drift chamber 12 may be determined based on temperature signals received from the plurality of thermal sensors 16.

In some examples, drift chamber 12 is not actively heated, and the temperature within drift chamber 12 is substantially the same as room temperature or ambient temperature. In other examples, system 10 further includes a chamber heater (not shown) configured to heat drift chamber 12 to a predetermined temperature. In some examples, drift chamber 12 is maintained at a substantially constant target temperature. In some examples, the chamber heater provides a thermal gradient along a portion of drift chamber 12, for example, along a length of drift chamber 12.

Controller 18 may include a computing device (for example, as described with reference to FIG. 2) or processing circuitry. In some examples, the processing circuitry is configured to determine, based on the temperature signal, a mobility relation for a target species with respect to the ionized calibrant. For example, a mobility factor $$R_c^t(T)$$

for a particular target species (t) and a particular calibrant (c) may be a function of temperature (T). Thus, the magnitude of the mobility factor $$R_c^t(T)$$

may vary with temperature T, for a predetermined combination of target species (1) and a particular calibrant (c). In some examples, the mobility factor $$R_c^t(T)$$

at a predetermined temperature T may be related to a target drift time $(D)_t(T)$) and calibrant drift time ($D_c(T)$) at that temperature using a linear function shown in EQUATION 1, where A is a constant which may be individual for each ion mobility system.

$$D_t(T) = A + R_c^t(T) * D_c(T) \quad \text{(Equation 1)}$$

While EQUATION 1 represents a linear relationship between target drift time $D_t(T)$ and calibrant drift time $D_c(T)$, in other examples, target drift time $D_t(T)$ and calibrant drift time $D_c(T)$ may have a non-linear relationship. Thus, the mobility relation may be a linear function or a non-linear function of the calibrant drift time. Any suitable predetermined mathematical relationship between target drift time $D_t(T)$ and calibrant drift time $D_c(T)$ may be used to determine $D_t(T)$ based on a measured or determined calibrant drift time $D_c$.

The processing circuitry may be further configured to determine, based on the drift signal, a calibrant drift time ($D_c$) and a sample drift time ($D_s$). For example, the drift signal may include a first component indicative of the calibrant drift time and a second component indicative of the sample drift time. In some examples, the calibrant drift time corresponds to a first time at which a first peak corresponding to the calibrant is detected, for example, the largest peak observed in a chromatography run. The sample drift time may correspond to a second time at which a second peak, for example, shorter than the calibrant peak, is observed.

Therefore, if the relation between mobility relation $$R_c^t(T)$$

and temperature T is known (for example, by prior calibration, historical runs, databases, or some other sources), and the measured calibrant drift time $D_c$ is known (for example, being determined by the processing circuitry based on the drift signal received from ion detector 14), an expected drift time $D_e$ for a target species may be calculated using EQUATION 1.

For example, based on the temperature T sensed by thermal sensor 16, the processing circuitry may determine a value of $$R_c^t(T)$$

associated with the temperature T'based on at least one of a lookup table, a mobility relation database, a predetermined equation that relates mobility relation $$R_c^t(T)$$

to temperature, interpolation, extrapolation, or other statistical techniques.

The processing circuitry may be further configured to determine, based on the mobility relation and the calibrant drift time, a target drift time for the target species. For example, the processing circuitry may multiply the value of $$R_c^t(T)$$

with the measured calibrant drift time $D_c$ to determine the expected target drift time $D_e$ for the target species using EQUATION 1. In some examples, the processing circuitry may determine a plurality of expected drift times for a plurality of target species.

The processing circuitry may be further configured to detect the target species in the ionized sample by comparing the sample drift time ($D_s$) with the target drift time ($D_e$). For example, the processing circuitry may compare the sample drift time $D_s$ with the expected drift time $D_e$ for the target species (or with a plurality of expected drift times for different target species) to detect the target species (or one species of the plurality of target species) in the sample. For example, if the sample drift time $D_s$ and the expected drift time $D_e$ are equal, or approximately equal within a predetermined tolerance range, the processing circuitry may determine that the sample includes the target species. If the sample drift time $D_s$ and the expected drift time $D_e$ differ in value, for example, beyond the predetermined tolerance range, the processing circuitry may determine that the target species is absent in the sample.

In some examples, the processing circuitry is further configured to determine a presence of the target species in response to determining that the sample drift time is within a predetermined drift time range including the target drift time. In some examples, the predetermined drift time range is ±10% of the target drift time, or ±5% of the target drift time, or ±3% of the target drift time, or #1% of the target drift time. The predetermined drift time range may be symmetric or asymmetric about the target drift time. For example, if manufacturing or measurement tolerances typically result in an underestimate of the target drift time, the drift time range may have a lower bound that is relatively more distant from the target drift time compared to an upper bound.

The processing circuitry may be further configured to generate an output indicative of the presence of the target species. For example, system 10 may include an output device (not shown in FIG. 1), and controller 18 may be configured to send an output signal to the output device, which may display or generate an output in response to the output signal. For example, the output may include at least one of a digital signal, an audio signal, or a display signal.

System 10 may further include a data acquisition module 20 coupled to the ion detector 14, with controller 18 being communicatively coupled to data acquisition module 20. Data acquisition module 20 is configured to generate data indicative of ions detected by ion detector 14. For example, ion detector 14 may generate an analog signal, while data acquisition module 20 may generate a digital signal based on the analog signal received from ion detector 14. In other examples, controller 18 itself may include a data acquisition module, or otherwise acquire a drift signal from ion detector 14. Controller 18 may be used to perform spectrometric analyses of data imported from data acquisition module 20 (or ultimately from ion detector 14). Alternatively, or in addition, controller 18 may be used to control the operation of system 10, for example, by controlling one or more of drift chamber 12, ion detector 14, data acquisition module 20, or any other apparatus associated with or a component of system 10.

System 10 may further include a field generator 24 configured to generate an electric field along drift chamber 12. In some examples, the electric field promotes drifting of the ionized sample and the ionized calibrant along the drift chamber toward the ion detector 14.

System 10 may further include an ionization chamber 26 configured to ionize a sample volume into the ionized sample and a calibrant volume into the ionized calibrant. Ionization chamber 26 may include an energy source, for example, an arc, a corona, or a plasma, or some other ionization source. In some such examples, drift chamber 12 is between ion detector 14 and ionization chamber 26. In some examples, ionization chamber 26 may face or be coupled to a first face or end of drift chamber 12, while ion detector 14 may face or be coupled to a second face or end of drift chamber 12 opposing the first face or end. In some examples, drift chamber 12, ion detector 14, and ionization chamber 26 may be formed as separate partitions or compartments within a single housing. In some examples, drift chamber 12, ion detector 14, and ionization chamber 26 may be mechanically coupled to secured to each other. In some such examples, drift chamber 12, ion detector 14, and ionization chamber 26 may be removably coupled. For example, ion detector 14 or ionization chamber 26 may be removable or separable from drift chamber 12 to facilitate maintenance, cleaning, or repair of one or more of drift chamber 12, ion detector 14, or ionization chamber 26.

The sample volume introduced into ionization chamber 26 may be generated by fluidization of an analyte sample. The analyte sample may include a solid, liquid, gel, suspension, or a composition in any suitable form including an analyte. In some such examples, system 10 further includes a sample chamber 28 configured to fluidize an analyte sample to generate the sample volume. For example, sample chamber 28 may include or define a sample air inlet 30 configured to introduce air to fluidize the analyte sample. In some examples, sample air inlet 30 includes a nozzle. Air (or another fluidizing carrier gas or gaseous mixture) may be drawn into sample air inlet 30 by a pressure differential or a motive element, and may fluidize the analyte sample into the sample volume. The fluidization may include vaporization or aerosolization. Thus, the sample volume may include particles or droplets of the analyte sample suspended in air, or vaporized or gas molecules of the analyte sample. In some examples, system 10 further includes a sample line 32 fluidly coupling sample chamber 28 to ionization chamber 26 and configured to introduce the sample volume into ionization chamber 28. In some examples, sample chamber 28 includes a heating system configured to heat sample chamber 28 (and thus, the sample volume) to a predetermined temperature.

System 10 may include another chamber, for example, to introduce a calibrant into ionization chamber 26. In some examples, system 10 further includes a calibrant chamber 34 configured to fluidize a calibrant composition to generate the calibrant volume. Any suitable calibrant composition may be used. In some examples, the calibrant composition includes at least one of DPGME or salicylic acid.

Calibrant chamber 34 may include or define a calibrant air inlet 36 configured to introduce air to fluidize the calibrant composition into the calibrant volume. In some examples, calibrant air inlet 36 includes a nozzle. Air (or another fluidizing carrier gas or gaseous mixture) may be drawn into calibrant air inlet 36 by a pressure differential or a motive element, and may fluidize the calibrant composition into the calibrant volume. Thus, the calibrant volume may include particles or droplets of the calibrant composition suspended in air, or vaporized or gas molecules of the calibrant composition. In some examples, system 10 further includes a calibrant line 38 fluidly coupling calibrant chamber 34 to ionization chamber 26 and configured to introduce the calibrant volume into ionization chamber 26. In some examples, calibrant chamber 34 includes a heating system configured to heat calibrant chamber 34 (and thus, the calibrant volume) to a predetermined temperature.

In some examples, a reagent composition may be introduced into calibrant chamber 34, and calibrant chamber 34 may be used to fluidize the reagent composition to generate a reagent volume. The reagent volume may be introduced into ionization chamber 26. In some examples, the reagent composition includes a reagent, for example, a dopant, configured to interact with or react with the analyte or the ionized analyte. Any suitable reagent composition may be used. In some examples, the reagent composition includes DPGME as a dopant. In some examples, one or both of the reagent or an ionized reagent may interact with the analyte or the ionized analyte. In some examples, system 10 may include an additional chamber, for example, a reagent chamber, substantially similar to, but separate from, calibrant chamber 34.

Air or another carrier fluid introduced into drift chamber 12, for example, via ionization chamber 26, may flow along drift chamber 12, carrying ions along drift chamber 12, and exit drift chamber 12. For example, drift chamber 12 may further include an air outlet 40 configured to allow a stream of air to flow along and depart drift chamber 12. In some examples, air may flow through drift chamber 12 into ion detector 14, and ion detector 14 may include air outlet 40. Air outlet 40 may include or be coupled to an exhaust device or system, for example, a pump or a fan, to promote exhausting or removal of air from drift chamber 12.

Thus, system 10 may be used to perform IMS while accounting for temperature of drift chamber 12.

In some examples, a portable spectrometry device may include a handheld housing, the handheld housing including ion mobility spectrometry system 10. For example, the handheld housing may be dimensioned and configured to be carried and operated by hand. In some examples, the handheld housing includes a sample inlet to introduce a sample, and a calibrant inlet to introduce a calibrant. In some examples, the portable spectrometry device includes a benchtop housing including ion mobility spectrometry system 10.

Figure 2:
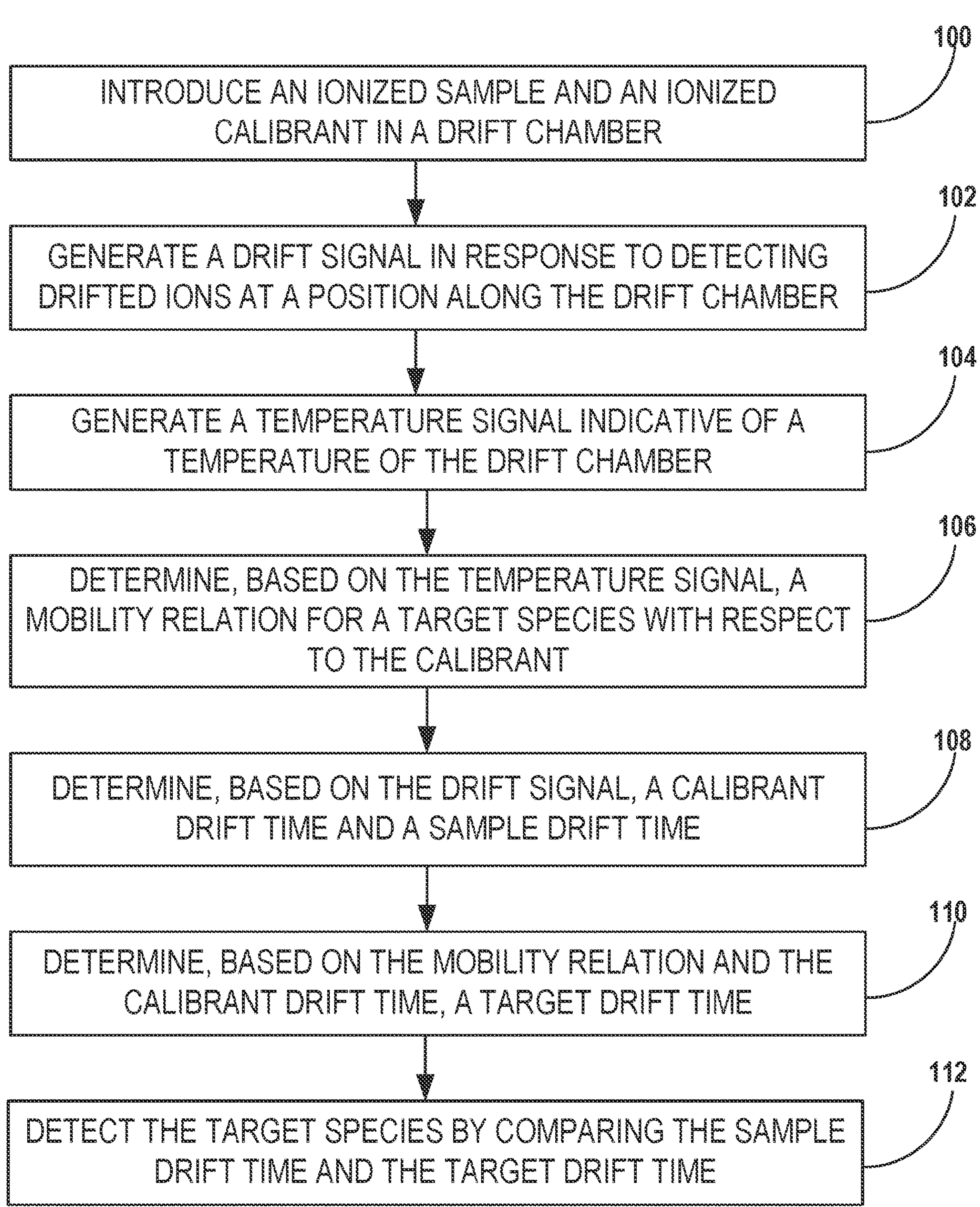
FIG. 2 is a flow diagram illustrating an example method for ion mobility spectrometry, in accordance with one or more aspects of this disclosure.

FIG. 2 is a flow diagram illustrating an example method for ion mobility spectrometry, in accordance with one or more aspects of this disclosure. While the method of FIG. 2 is described with reference to system 10 of FIG. 1, the method of FIG. 2 may be implemented using any suitable system.

In some examples, the method of FIG. 2 includes introducing an ionized sample and an ionized calibrant in drift chamber 12 (100).

The ionized sample and the ionized calibrant may flow along drift chamber 12, for example, toward ion detector 14, at different mobilities. In some examples, the method further includes generating an electric field along drift chamber 12, for example, along at least a portion of drift chamber 12. The mobilities of the ionized sample and the ionized calibrant may be independently influenced by the electric field. For example, the electric field may have a field strength configured to sufficiently separate the ionized sample and the ionized calibrant by inducing a difference in their respective mobilities.

The method may further include ionizing a sample volume into the ionized sample and a calibrant volume into the ionized calibrant. For example, the sample volume and the calibrant volume may be ionized in ionization chamber 26 to respectively generate the ionized sample and the ionized calibrant. In some such examples, the method may further include one or both of fluidizing an analyte sample to generate the sample volume or fluidizing a calibrant composition to generate the calibrant volume. For example, the analyte sample may be fluidized in sample chamber 28, and the calibrant composition may be fluidized in calibrant chamber 34, to respectively generate the sample volume and the calibrant volume to be introduced into ionization chamber 26.

The sample volume (or ultimately, the analyte sample) may include at least one of an explosive, a narcotic, a chemical warfare agent, a pesticide, a toxic industrial chemical, or a pharmaceutical trace contaminant. In some examples, the sample volume (or ultimately, the analyte sample) includes triacetone triperoxide (TATP).

The calibrant composition may include a solid or a liquid. In some examples, the calibrant composition includes at least one of dipropylene glycol monomethyl ether (DPMGE) or salicylic acid.

The method may further include reacting a reagent volume with the calibrant volume. For example, the reagent volume may be reacted with the calibrant volume in ionization chamber 26. In some such examples, the method may further include fluidizing a reagent composition to generate the reagent volume. The reagent composition may include a dopant or another reagent. The reagent composition may include a solid or a liquid. In some such examples, the reagent composition includes dipropylene glycol monomethyl ether (DPMGE).

The method may further include generating, by ion detector 14, a drift signal in response to detecting drifted ions at a predetermined position along drift chamber 12 (102).

The method may further include generating, by thermal sensor 16, a temperature signal indicative of a temperature of drift chamber 12 (104). The method may further include, by processing circuitry (or controller 18), determining, based on the temperature signal, a mobility relation for a target species with respect to the ionized calibrant (106). For example, the processing circuitry (or controller 18) may use the temperature as a query to determine a corresponding mobility relation associated that temperature based on a lookup table or a database, or by evaluating a mathematical function that relates the mobility relation to temperature for a predetermined combination of target species and calibrant. In some examples, the processing circuitry (or controller 18) may determine a respective mobility relation for each combination of a target species of a plurality of target species and the calibrant.

The method may further include, by the processing circuitry (or controller 18), determining, based on the drift signal, a calibrant drift time and a sample drift time (108). The method may further include, by the processing circuitry (or controller 18), determining, based on the mobility relation and the calibrant drift time, a target drift time for the target species (110). For example, the processing circuitry (or controller 18) may use EQUATION 2 or another relation to determine the target drift time based on the mobility relation and the calibrant drift time. In some examples, the processing circuitry (or controller 18) may determine the target drift time to be a multiplicative product of the mobility relation and the calibrant drift time. In some examples, the processing circuitry (or controller 18) may determine, based on a plurality of mobility relations (associated with a plurality of target species) and the calibrant drift time, a plurality of target drift times.

The method may further include, by the processing circuitry (or controller 18), detecting the target species in the ionized sample by comparing the sample drift time with the target drift time (112). For example, the processing circuitry (or controller 18) may mathematically compare the values of the sample drift time and the target drift time (or a plurality of target drift times).

Detecting the target species (112) may include determining, by the processing circuitry (or controller 18), a presence of the target species in response to determining that the sample drift time is within a predetermined drift time range including the target drift time. For example, the processing circuitry (or controller 18) may determine that the target species is present in the sample if the value of the sample drift is equal, or approximately equal within a predetermined tolerance range, to the target drift time. In some examples, the processing circuitry (or controller 18) may determine that a particular target species of a plurality of target species is present in the sample if the value of the sample drift time is equal, or approximately equal within a predetermined tolerance range, to the target drift time associated with the particular target drift species. For example, each target species of the plurality of target species may be associated with different expected drift times, and only one of the expected drift times may substantially match the sample drift time.

The method may further include, by the processing circuitry (or controller 18), generating an output indicative of the presence of the target species. The output may include at least one of a digital signal, an audio signal, or a display signal.

Thus, an operator may be alerted to the presence or absence of one or more target species in the sample, for example, by the output.

Figure 3:
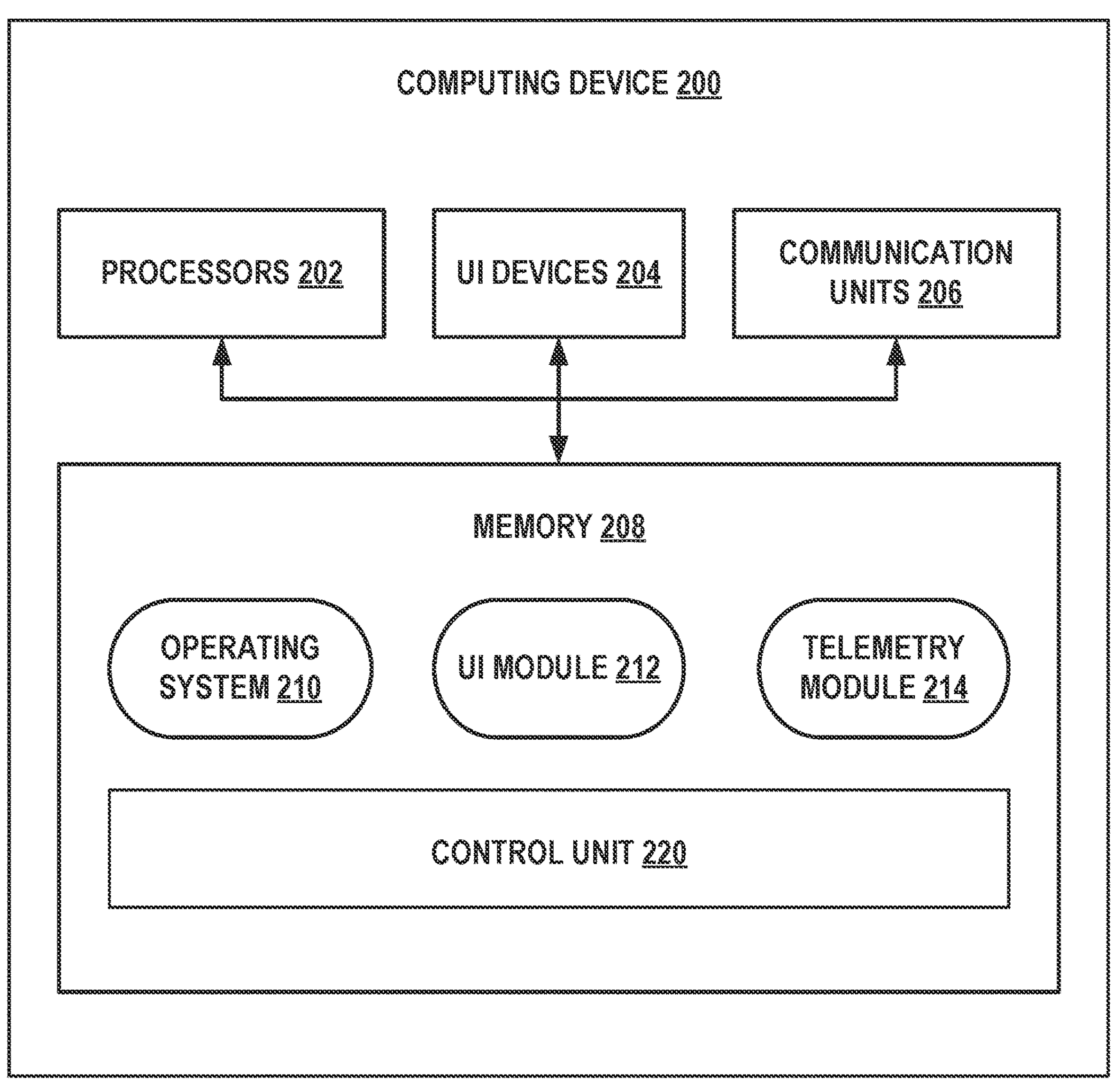
FIG. 3 is a block diagram illustrating an example computing device configured to control a system for ion mobility spectrometry, in accordance with one or more aspects of this disclosure.

FIG. 3 is a block diagram illustrating an example computing device 200 configured to control a system for ion mobility spectrometry, in accordance with one or more aspects of this disclosure. In some examples, computing device 200 may be an example instance of controller 18 of FIG. 1.

As shown in the example of FIG. 3, computing device 200 includes one or more processors 202, one or more user interface (UI) devices 204, one or more communication units 206, and one or more memory units 208. Memory 208 of computing device 200 includes operating system 210, UI module 212, telemetry module 214, and control unit 220, which are executable by processors 202. Each of the components, units or modules of computing device 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing device 200. For example, processors 202 may be capable of processing instructions stored by memory 208. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 208 may be configured to store information within computing device 200 during operation. Memory 208 may include a computer-readable storage medium or computer-readable storage device. In some examples, memory 208 includes one or more of a short-term memory or a long-term memory. Memory 208 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 208 is used to store program instructions for execution by processors 202. Memory 208 may be used by software or applications running on computing device 200 (e.g., control unit 220) to temporarily store information during program execution.

Computing device 200 may utilize communication units 206 to communicate with external devices via one or more networks or via wireless signals. Communication units 206 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 200 utilizes communication units 206 to wirelessly communicate with one or more external devices, such as ion detector 14, thermal sensor 16, controller 18, or acquisition module 20 from FIG. 1.

UI devices 204 may be configured to operate as both input devices and output devices. For example, UI devices 204 may be configured to receive tactile, audio, or visual input from a user of computing device 200. In addition to receiving input from a user, UI devices 204 may be configured to provide output to a user using tactile, audio, or video stimuli. In one example, UI devices 204 may be configured to output content such as a GUI for display at a display device. UI devices 204 may include a presence-sensitive display that displays a GUI and receives input from a user using capacitive, inductive, and/or optical detection at or near the presence sensitive display.

Other examples of UI devices 204 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 204 include a speaker, a cathode ray tube (CRT) monitor, a liquid crystal display (LCD), organic light emitting diode (OLED), or any other type of device that can generate intelligible output to a user.

Operating system 210 controls the operation of components of computing device 200. For example, operating system 210, in one example, facilitates the communication of UI module 212, telemetry module 214, and control unit 220 with processors 202, UI devices 204, communication units 206, and memory 208. UI module 212, telemetry module 214, and control unit 220 may each include program instructions and/or data stored in memory 208 that are executable by processors 202. For example, control unit 220 may include instructions that cause computing device 200 to perform one or more of the techniques described in this disclosure.

Computing device 200 may include additional components that, for clarity, are not shown in FIG. 3. For example, computing device 200 may include a battery to provide power to the components of computing device 200. Similarly, the components of computing device 200 shown in FIG. 3 may not be necessary in every example of computing device 200.

In the example illustrated in FIG. 3, control unit 220 may be configured to control system 10 and/or any of its components, for example ion detector 14, thermal sensor 16, controller 18, or acquisition module 20, and/or any other hardware or component of system 10, for example, a fan or pump to move a volume or stream to or along drift chamber 12, and the like. In some examples, control unit 220 may be configured to detect the target species, for example, a presence, absence, concentration or amount of target species in the analyte sample, for example, based on data received from controller 18 and/or telemetry module 214. In some examples, control unit 220 may cause computing device 200 and/or processors 202 to execute one, more, or all portions of example methods described in the present disclosure, for example, example methods described with reference to FIG. 2.

EXAMPLES

Example 1

Figure 4:
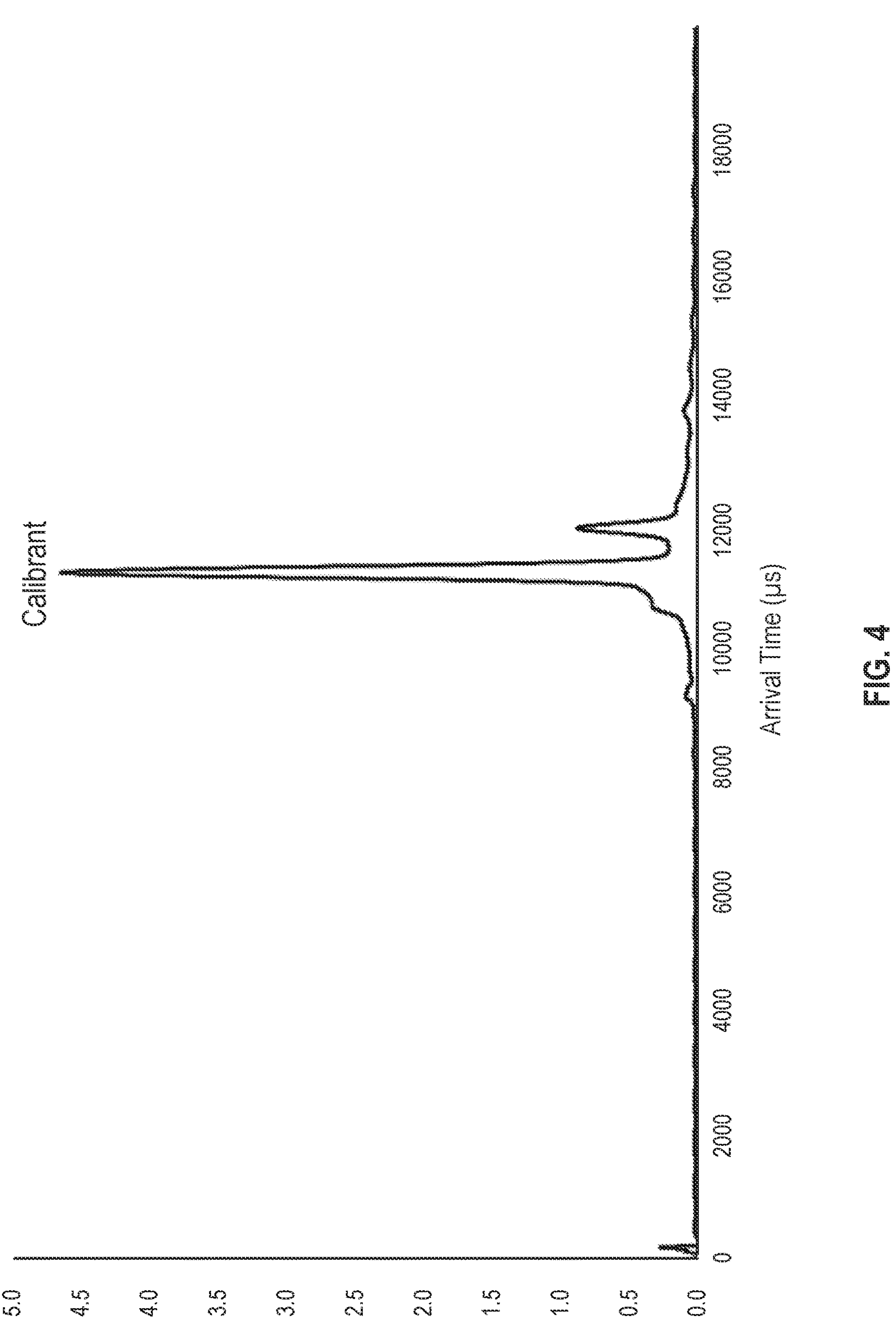
FIG. 4 is a plot illustrating an example ion mobility plasmagram of a vapor sample including dipropylene glycol monomethyl ether (DPGME) acquired in a positive ionization mode, in accordance with one or more aspects of this disclosure.

Dipropylene glycol monomethyl ether (DPGME) was introduced as a calibrant in a drift chamber of an ion mobility spectrometry system, and a plasmagram was determined for DPGME. FIG. 4 is a plot illustrating an example ion mobility plasmagram of a vapor sample including DPGME acquired in a positive ionization mode, in accordance with one or more aspects of this disclosure. As seen in FIG. 4, DPGME exhibited a pronounced peak at an arrival time of about 11000 μs.

Example 2

Figure 5:
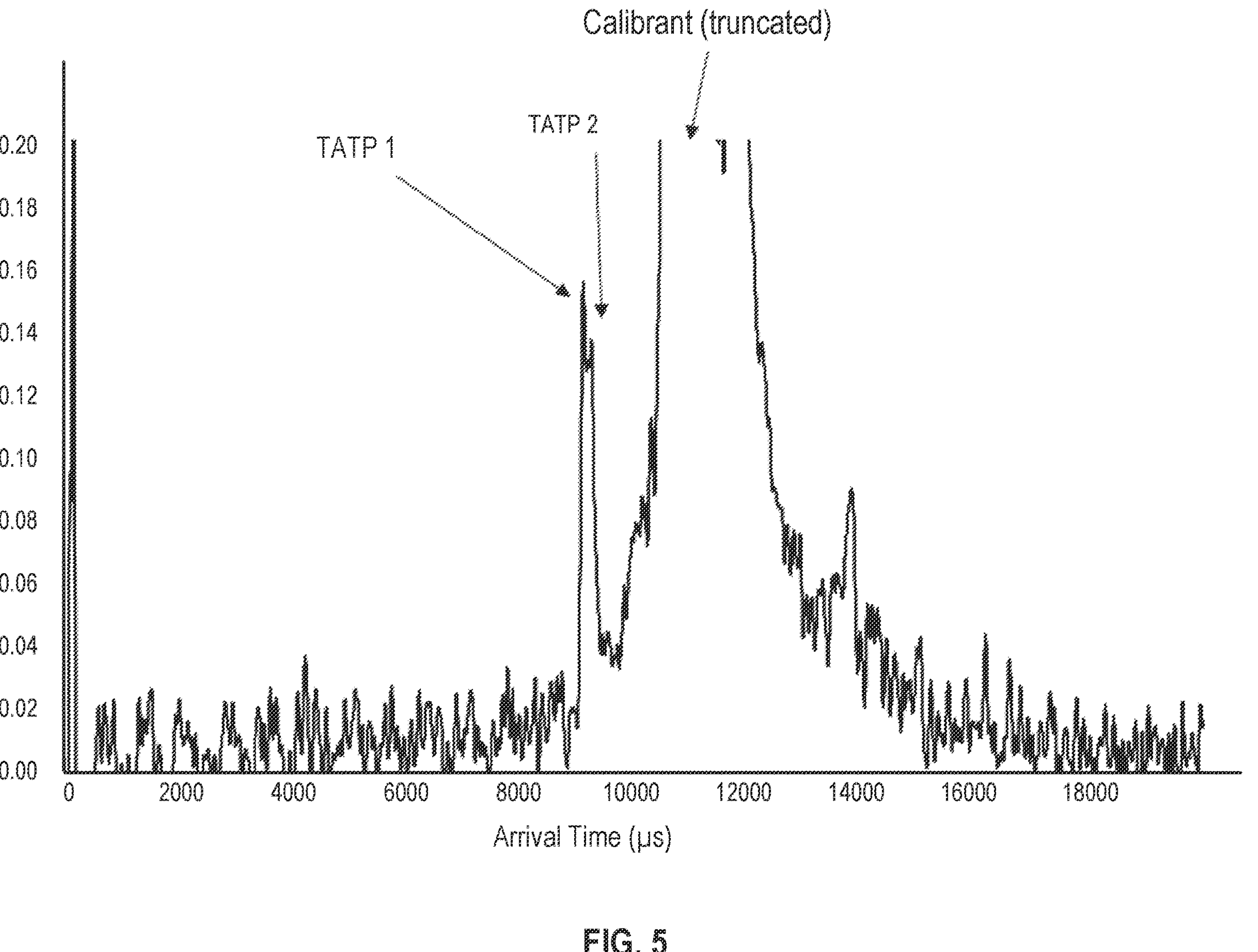
FIG. 5 is plot illustrating an example ion mobility plasmagram of a trace amount of triacetone triperoxide (TATP) demonstrating two TATP fragment ions formed from an $[TATP+DPGME]^+$ adduct ion peak, in accordance with one or more aspects of this disclosure.

Dipropylene glycol monomethyl ether (DPGME) was introduced as a dopant in the presence of triacetone triperoxide (TATP) as an analyte. FIG. 5 is plot illustrating an example ion mobility plasmagram of a trace amount of TATP demonstrating two TATP fragment ions formed from an $[TATP+DPGME]^+$ adduction peak, in accordance with one or more aspects of this disclosure.

Example 3

Figure 6:
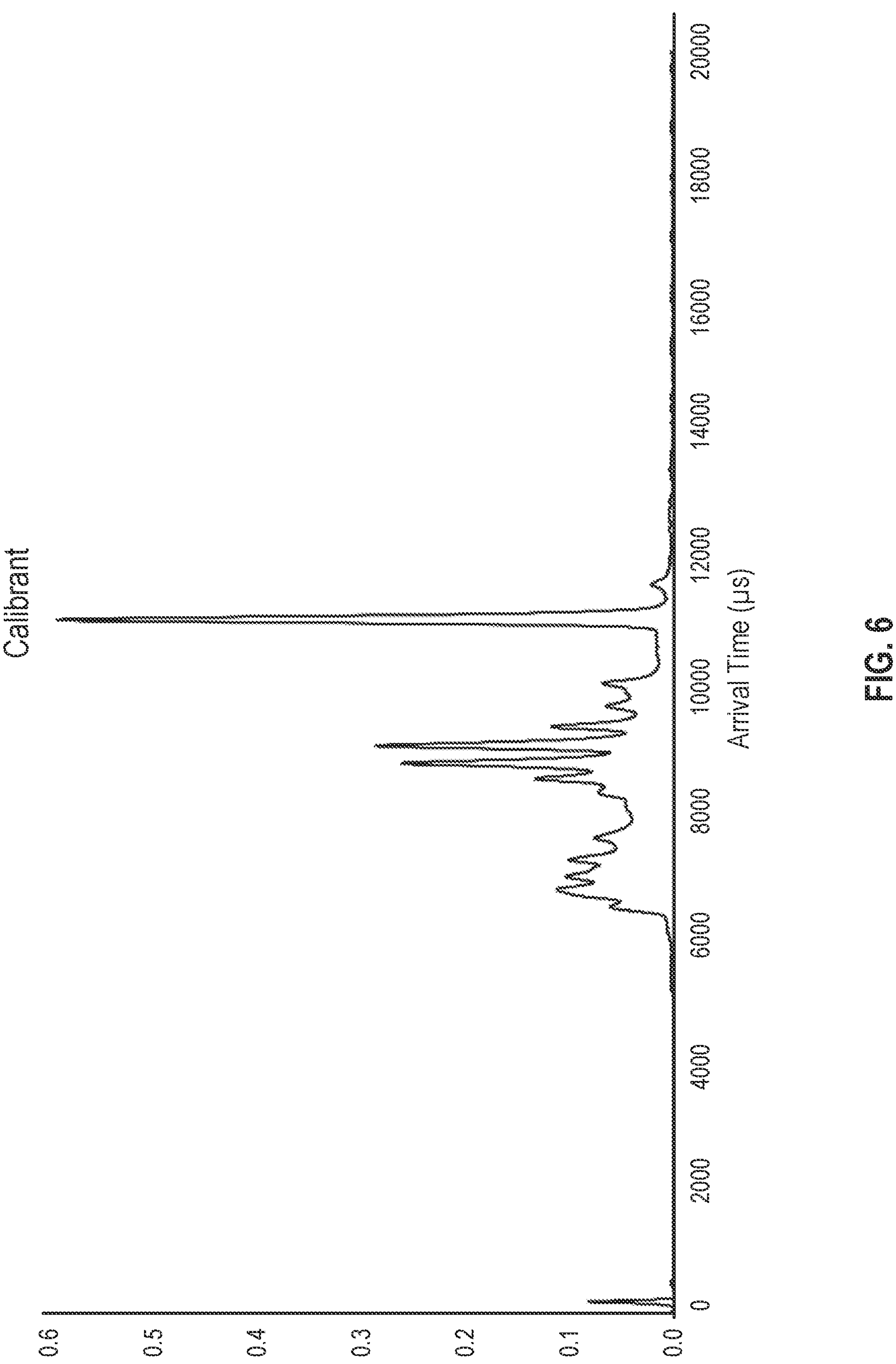
FIG. 6 is a plot illustrating an example ion mobility plasmagram of a vapor sample including salicylic acid acquired in a negative ionization mode, in accordance with one or more aspects of this disclosure.

Salicylic acid was introduced as a calibrant in a drift chamber of an ion mobility spectrometry system, and a plasmagram was determined for salicylic acid. FIG. 6 is a plot illustrating an example ion mobility plasmagram of a vapor sample including salicylic acid acquired in a negative ionization mode, in accordance with one or more aspects of this disclosure. As seen in FIG. 6, salicylic acid exhibited a pronounced peak at an arrival time of about 11000 μs.

Example 4

Figure 7:
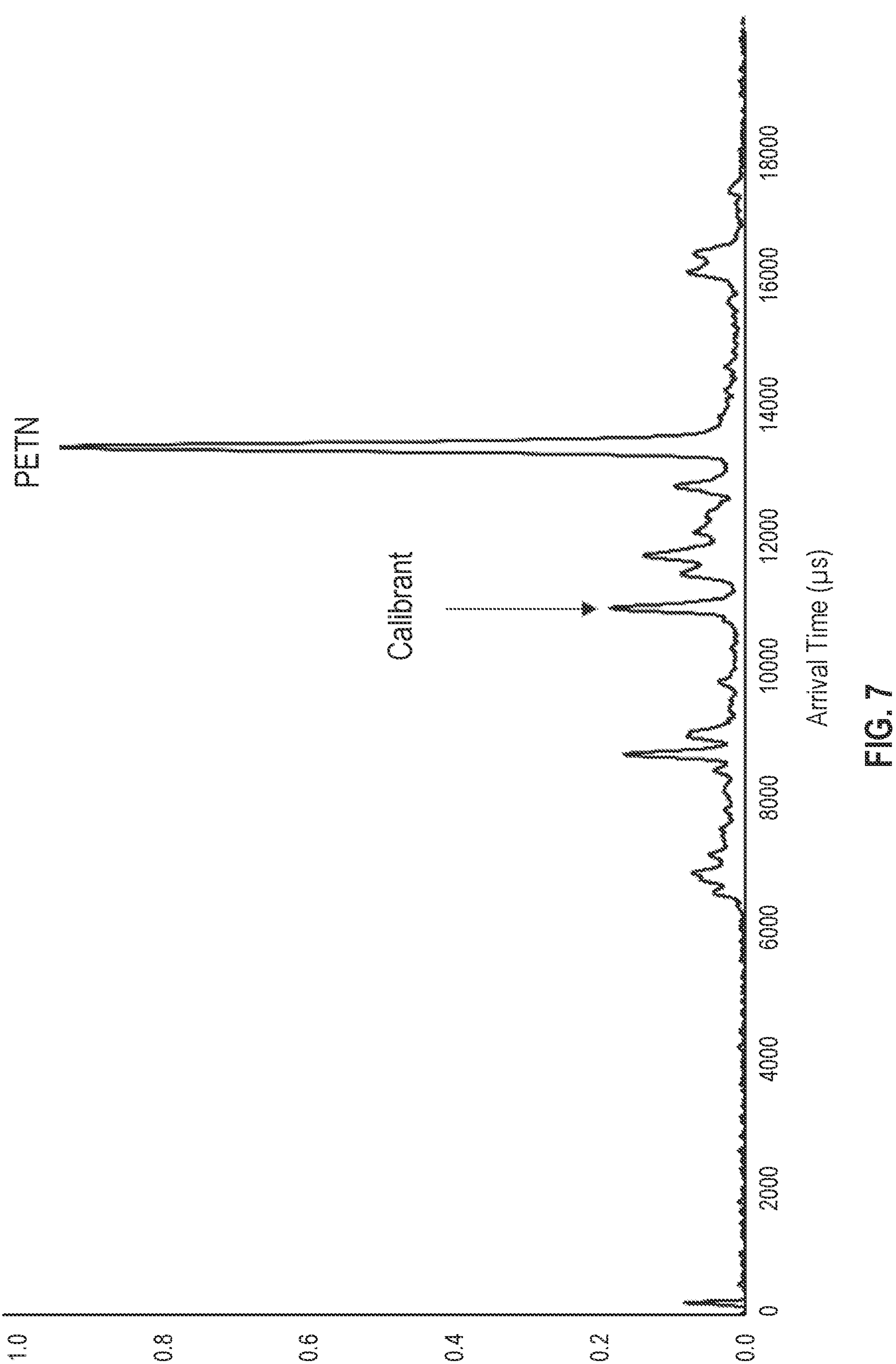
FIG. 7 is an exemplary ion mobility plasmagram of a vapor sample including pentaerythritol tetranitrate (PETN) and salicylic acid as a dopant demonstrating a $[PETN+salicylic\ acid]^-$ adduction peak, in accordance with one or more aspects of this disclosure.

Salicylic acid was introduced as a dopant in the presence of pentaerythritol tetranitrate (PETN) as an analyte. FIG. 7 is an exemplary ion mobility plasmagram of a vapor sample including pentaerythritol tetranitrate (PETN) and salicylic acid as a dopant demonstrating a $[PETN+salicylic\ acid]^-$ adduction peak, in accordance with one or more aspects of this disclosure.

Example 5

Figure 8:
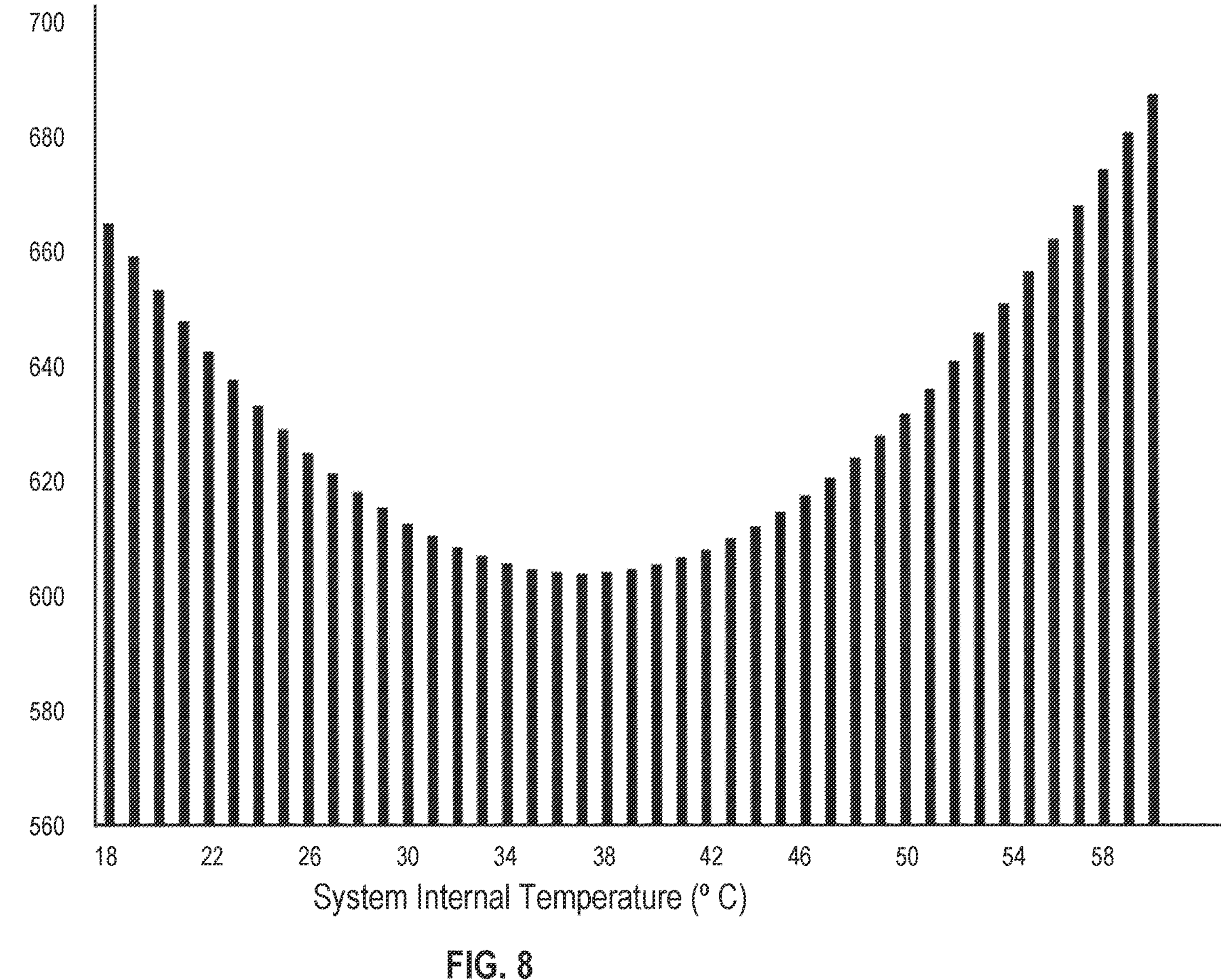
FIG. 8 is a histogram illustrating a relation between 95% confidence interval for PETN ion peak and an internal temperature of a spectrometry system based on a 3-months long multi-systems environmental test, in accordance with one or more aspects of this disclosure.

The effect of an internal temperature of a spectrometry system on accuracy of IMS detection of PETN was evaluated over a period of 3 months in a multi-systems environmental test, in accordance with one or more aspects of this disclosure. FIG. 8 is a histogram illustrating the relation between 95% confidence interval for PETN ion peak and the internal temperature of the spectrometry system. The histogram represents the accuracy of measuring an analyte ion signal based on the measurement of drift tube temperature and applying the calibration equation to the observed drift time of the analyte and calibrant ion signals to obtain a temperature-independent drift time.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

The present disclosure describes the following non-limiting enumerated aspects.

Aspect 1: An ion mobility spectrometry system including:

a drift chamber configured to receive an ionized sample and an ionized calibrant;

an ion detector configured to generate a drift signal in response to detecting drifted ions at a predetermined position along the drift chamber;

a thermal sensor configured to generate a temperature signal indicative of a temperature of the drift chamber; and processing circuitry configured to:

- determine, based on the temperature signal, a mobility relation for a target species with respect to the ionized calibrant;
- determine, based on the drift signal, a calibrant drift time and a sample drift time;
- determine, based on the mobility relation and the calibrant drift time, a target drift time for the target species; and
- detect the target species in the ionized sample by comparing the sample drift time with the target drift time.

Aspect 2: The system of aspect 1, where the processing circuitry is further configured to determine a presence of the target species in response to determining that the sample drift time is within a predetermined drift time range including the target drift time.

Aspect 3: The system of aspects 1 or 2, where the processing circuitry is further configured to generate an output indicative of the presence of the target species.

Aspect 4: The system of aspect 3, where the output includes at least one of a digital signal, an audio signal, or a display signal.

Aspect 5: The system of any of aspects 1 to 4, where the mobility relation is a linear function of the calibrant drift time.

Aspect 6: The system of any of aspects 1 to 5, further including a field generator configured to generate an electric field along the drift chamber.

Aspect 7: The system of any of aspects 1 to 6, where the ion detector includes an ion collector configured to attract the ionized sample and the ionized calibrant.

Aspect 8: The system of any of aspects 1 to 7, further including an ionization chamber configured to ionize a sample volume into the ionized sample and a calibrant volume into the ionized calibrant.

Aspect 9: The system of aspect 8, where the drift chamber is between the ion detector and the ionization chamber.

Aspect 10: The system of aspects 8 or 9, further including a sample chamber configured to fluidize an analyte sample to generate the sample volume.

Aspect 11: The system of aspect 10, where the sample chamber includes a sample air inlet configured to introduce air to fluidize the analyte sample.

Aspect 12: The system of aspects 10 or 11, further including a sample line fluidly coupling the sample chamber to the ionization chamber and configured to introduce the sample volume into the ionization chamber.

Aspect 13: The system of any of aspects 8 to 12, further including a calibrant chamber configured to fluidize a calibrant composition to generate the calibrant volume.

Aspect 14: The system of aspect 13, where the calibrant chamber includes a calibrant air inlet configured to introduce air to fluidize the calibrant composition into the calibrant volume.

Aspect 15: The system of aspects 13 or 14, further including a calibrant line fluidly coupling the calibrant chamber to the ionization chamber and configured to introduce the calibrant volume into the ionization chamber.

Aspect 16: The system of any one of aspects 1 to 15, where the drift chamber further includes an air outlet configured to allow a stream of air to flow along and depart the drift chamber.

Aspect 17: A portable spectrometry device including a handheld housing, the handheld housing including the ion mobility spectrometry system of any of claims 1 to 16.

Aspect 18: A method for ion mobility spectrometry, the method including:

introducing an ionized sample and an ionized calibrant in a drift chamber;

generating, by an ion detector, a drift signal in response to detecting drifted ions at a predetermined position along the drift chamber;

generating, by a thermal sensor, a temperature signal indicative of a temperature of the drift chamber; and by processing circuitry:

determining, based on the temperature signal, a mobility relation for a target species with respect to the ionized calibrant;

determining, based on the drift signal, a calibrant drift time and a sample drift time;

determining, based on the mobility relation and the calibrant drift time, a target drift time for the target species; and detecting the target species in the ionized sample by comparing the sample drift time with the target drift time.

Aspect 19: The method of aspect 18, where detecting the target species includes determining, by the processing circuitry, a presence of the target species in response to determining that the sample drift time is within a predetermined drift time range including the target drift time.

Aspect 20: The method of aspect 19, further including, by the processing circuitry, generating an output indicative of the presence of the target species.

Aspect 21: The method of aspect 20, where the output includes at least one of a digital signal, an audio signal, or a display signal.

Aspect 22: The method of any of aspects 18 to 21, where the mobility relation is a linear function of the calibrant drift time.

Aspect 23: The method of any of aspects 18 to 22, further including generating an electric field along the drift chamber.

Aspect 24: The method of any of aspects 18 to 23, further including ionizing a sample volume into the ionized sample and a calibrant volume into the ionized calibrant.

Aspect 25: The method of aspect 24, further including fluidizing an analyte sample to generate the sample volume.

Aspect 26: The method of aspects 24 or 25, further including fluidizing a calibrant composition to generate the calibrant volume.

Aspect 27: The method of aspect 26, where the calibrant composition includes a solid or a liquid.

Aspect 28: The method of aspects 26 or 27, where the calibrant composition includes at least one of dipropylene glycol monomethyl ether (DPMGE) or salicylic acid.

Aspect 29: The method of any of aspects 24 to 28, further including reacting a reagent volume with the calibrant volume.

Aspect 30: The method of aspect 29, further including fluidizing a reagent composition to generate the reagent volume.

Aspect 31: The method of aspect 30, where the reagent composition includes a solid or a liquid.

Aspect 32: The method of aspects 30 or 31, where the reagent composition includes dipropylene glycol monomethyl ether (DPMGE).

Aspect 33: The method of any of aspects 24 to 32, where the sample volume includes at least one of an explosive, a narcotic, a chemical warfare agent, a pesticide, a toxic industrial chemical, or a pharmaceutical trace contaminant.

Aspect 34: The method of aspect 33, where the sample volume includes triacetone triperoxide (TATP).

Aspect 35: Non-transitory computer-readable media including instructions that, when executed, cause processing circuitry to:

determine, based on a drift signal received from an ion detector in response to detecting drifted ions at a predetermined position along a drift chamber, a calibrant drift time of an ionized calibrant and a sample drift time of an ionized sample in the drift chamber;

determine, based on a temperature signal indicative of a temperature of the drift chamber received from a thermal sensor, a mobility relation for a target species with respect to the ionized calibrant;

determine, based on the mobility relation and the calibrant drift time, a target drift time for the target species; and detect the target species in the ionized sample by comparing the sample drift time with the target drift time.

Aspect 36: A method for detecting a chemical substance, the method including:

introducing a sample including at least one chemical substance into an ionization region of an ion mobility spectrometer;

introducing a reagent gas into the region, where the reagent gas includes dipropylene glycol monomethyl ether;

generating ion(s) at least one of the at least one chemical substance or the reagent gas within the region;

allowing the ion(s) to interact with at least one of the chemical substance or the reagent gas within the region, where the interaction yields one or more analyte ions; and performing an analysis of the analyte ions.

Aspect 37: The method of aspect 35, where the at least one chemical substance includes at least one of an explosive, a narcotic, a chemical warfare agent, a pesticide, a toxic industrial chemical, or a pharmaceutical trace contaminant.

Aspect 38: The method of aspect 37, where the at least one chemical substance includes triacetone triperoxide (TATP).

Aspect 39: A method for calibration of an ion mobility spectrometer, the method including:

introducing a sample including at least one chemical substance into an ionization region of an ion mobility spectrometer;

introducing a calibrant chemical into the region, where the calibrant chemical includes at least one of dipropylene glycol monomethyl ether or salicylic acid;

generating ions of the at least one chemical substance and the calibrant chemical within the region;

determining the drift time of ions of the calibrant chemical through the ion mobility spectrometer; and determining the expected drift time of a target chemical using pre-determined relations of the reduced mobilities of the target chemical and the calibrant chemical.

Aspect 40: A method for calibration of an ion mobility spectrometer, the method including:

delivering a sample including at least one chemical substance into an ionization region of an ion mobility spectrometer;

introducing a calibrant gas into the region;

generating ions of the at least one chemical substance and the calibrant chemical within the region;

determining the drift time of ions of the calibrant chemical through the ion mobility spectrometer; and determining the expected drift time of a target chemical using relations of the reduced mobilities of the target chemical and the calibrant chemical, where at least one relation is a function of temperature measured by a temperature sensor located in the vicinity of the ion mobility spectrometer.

Aspect 41: The method of aspect 40, where the calibrant gas includes at least one of dipropylene glycol monomethyl ether or salicylic acid.

Aspect 42: The method of aspects 40 or 41, where the ion mobility spectrometer includes a drift tube with a varying temperature.

Aspect 43: The method of aspects 40 or 41, where the ion mobility spectrometer further includes the drift tube at substantially ambient temperature.

Aspect 44: A system for detecting a chemical substance, the system including:

an ion mobility spectrometer including a gas ionization region, where sample vapor and reagent gas molecules may be ionized, a drift region fluidly coupled with the ionization region, where an electric field is provided to transport ions towards a charge collector and the charge collector at the end of the drift region opposite the ionization region;

a compartment fluidly coupled with the ionization region, where a reagent gas is produced from solid or liquid-phase reagent chemicals including dipropylene glycol monomethyl ether (DPMGE); and an analysis unit configured to detect the presence of the one or more analyte ions of chemical substance in the sample from a drift time of the analyte ion through the drift region.

Aspect 45: The system of aspect 44, where the compartment with the reagent chemical is temperature controlled.

Aspect 46: A system for calibration of an ion mobility spectrometer, the system including:

an ion mobility spectrometer including a gas ionization region, where sample vapor and calibrant gas molecules may be ionized, a drift region fluidly coupled with the ionization region, where an electric field is provided to transport ions towards a charge collector and the charge collector at the end of the drift region opposite the ionization region;

a compartment fluidly coupled with the ionization region, where a calibrant gas is produced from solid or liquid-phase reagent chemicals including at least one of dipropylene glycol monomethyl ether (DPMGE) or salicylic acid; and an analysis unit configured to determine the expected drift time of a target chemical using pre-determined relations of the reduced mobilities of the target chemical and the calibrant chemical.

Aspect 47: A system for calibration of an ion mobility spectrometer, the system including:

an ion mobility spectrometer including a gas ionization region, where sample vapor and calibrant gas molecules are ionized, a drift region fluidly coupled with the ionization region, where an electric field is provided to transport ions towards a charge collector and the charge collector at the end of the drift region opposite the ionization region;

a compartment fluidly coupled with the ionization region, where the calibrant gas is produced;

a temperature sensor in the vicinity of the ion mobility spectrometer and an analysis unit that determines the expected drift time of a target chemical using relations of the reduced mobilities of the target chemical and the calibrant chemical, where at least one relation is a function of temperature measured by the temperature sensor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Based upon the above discussion and illustrations, it is recognized that various modifications and changes may be made to the disclosed technology in a manner that does not necessarily require strict adherence to the examples and applications illustrated and described herein. Such modifications do not depart from the true spirit and scope of various aspects of the disclosure, including aspects set forth in the claims.

What is claimed is:

1. An ion mobility spectrometry system comprising:

a drift chamber configured to receive an ionized sample and an ionized calibrant;

an ion detector configured to generate a drift signal in response to detecting drifted ions at a predetermined position along the drift chamber;

a thermal sensor configured to generate a temperature signal indicative of a temperature T of the drift chamber; and processing circuitry configured to:

determine, based on the temperature signal, a mobility relation for a target species with respect to the ionized calibrant;

determine, based on the drift signal, a calibrant drift time and a sample drift time;

determine, based on the mobility relation and the calibrant drift time, a target drift time for the target species using EQUATION 1:

$$D_t(T) = A + R_c^t(T) * D_c(T); \quad \text{(Equation 1)}$$

and detect the target species in the ionized sample by comparing the sample drift time with the target drift time, wherein $D_t(T)$ is the target drift time, $D_c(T)$ is the calibrant drift time, $$R_c^t(T)$$

is the mobility relation, and A is a constant.

2. The system of claim 1, wherein to detect the target species, the processing circuitry is further configured to determine that the sample drift time is within a predetermined drift time range comprising the target drift time.

3. The system of claim 1, wherein the processing circuitry is further configured to generate an output indicative of a presence of the target species in the ionized sample.

4. The system of claim 1, wherein the mobility relation is a linear function of the calibrant drift time.

5. The system of claim 1, further comprising an ionization chamber configured to ionize a sample volume into the ionized sample and a calibrant volume into the ionized calibrant, wherein the drift chamber is between the ion detector and the ionization chamber.

6. The system of claim 5, further comprising a sample chamber configured to fluidize an analyte sample to generate the sample volume.

7. The system of claim 5, further comprising a calibrant chamber configured to fluidize a calibrant composition to generate the calibrant volume.

8. A portable spectrometry device comprising a handheld housing, the handheld housing comprising the ion mobility spectrometry system of claim 1.

9. A method for ion mobility spectrometry, the method comprising:

introducing an ionized sample and an ionized calibrant in a drift chamber;

generating, by an ion detector, a drift signal in response to detecting drifted ions at a predetermined position along the drift chamber;

generating, by a thermal sensor, a temperature signal indicative of a temperature T of the drift chamber; and by processing circuitry:

determining, based on the temperature signal, a mobility relation for a target species with respect to the ionized calibrant;

determining, based on the drift signal, a calibrant drift time and a sample drift time;

determining, based on the mobility relation and the calibrant drift time, a target drift time for the target species using EQUATION 1:

$$D_t(T) = A + R_c^t(T) * D_c(T); \quad \text{(Equation 1)}$$

and detecting the target species in the ionized sample by comparing the sample drift time with the target drift time, wherein $D_t(T)$ is the target drift time, $D_c(T)$ is the calibrant drift time, $$R_c^t(T)$$

is the mobility relation, and A is a constant.

10. The method of claim 9, wherein detecting the target species comprises determining, by the processing circuitry, that the sample drift time is within a predetermined drift time range comprising the target drift time.

11. The method of claim 10, further comprising, by the processing circuitry, generating an output indicative of a presence of the target species in the ionized sample, wherein the output comprises at least one of a digital signal, an audio signal, or a display signal.

12. The method of claim 9, wherein the temperature T of the drift chamber is at room temperature.

13. The method of claim 9, wherein the mobility relation is a linear function of the calibrant drift time.

14. The method of claim 9, further comprising ionizing a sample volume into the ionized sample and a calibrant volume into the ionized calibrant.

15. The method of claim 14, further comprising fluidizing a calibrant composition to generate the calibrant volume.

16. The method of claim 15, wherein the calibrant composition comprises at least one of dipropylene glycol monomethyl ether (DPMGE) or salicylic acid.

17. The method of claim 14, further comprising reacting a reagent volume with the calibrant volume.

18. The method of claim 17, further comprising fluidizing a reagent composition to generate the reagent volume.

19. The method of claim 18, wherein the reagent composition comprises dipropylene glycol monomethyl ether (DPMGE).

20. Non-transitory computer-readable media comprising instructions that, when executed, cause processing circuitry to:

determine, based on a drift signal received from an ion detector in response to detecting drifted ions at a predetermined position along a drift chamber, a calibrant drift time of an ionized calibrant and a sample drift time of an ionized sample in the drift chamber;

determine, based on a temperature signal indicative of a temperature T of the drift chamber received from a thermal sensor, a mobility relation for a target species with respect to the ionized calibrant;

determine, based on the mobility relation and the calibrant drift time, a target drift time for the target species using EQUATION 1:

$$D_t(T) = A + R_c^t(T) * D_c(T); \quad \text{(Equation 1)}$$

and detect the target species in the ionized sample by comparing the sample drift time with the target drift time, wherein $D_t(T)$ is the target drift time, $D_c(T)$ is the calibrant drift time, $$R_c^t(T)$$

is the mobility relation, and A is a constant.

* * * * *